United States Patent [19]

Belart

[11] 4,116,495
[45] Sep. 26, 1978

[54] DEVICE FOR HYDRAULIC BRAKING SYSTEM INCORPORATING ANTISKID CONTROL APPARATUS

[75] Inventor: Juan Belart, Walldorf, Fed. Rep. of Germany

[73] Assignee: ITT Industries, Inc., New York, N.Y.

[21] Appl. No.: 832,261

[22] Filed: Sep. 12, 1977

[30] Foreign Application Priority Data

Oct. 2, 1976 [DE] Fed. Rep. of Germany ....... 2644659

[51] Int. Cl.² ............................................... B60T 8/00
[52] U.S. Cl. .................................... 303/115; 303/116
[58] Field of Search .................. 303/115, 116, 6 C, 10

[56] References Cited

U.S. PATENT DOCUMENTS 3,747,990   7/1973   Tanguy ................................. 303/115

*Primary Examiner*—Trygve M. Blix
*Assistant Examiner*—Reinhard J. Eisenzopf
*Attorney, Agent, or Firm*—John T. O'Halloran; Alfred C. Hill

[57] ABSTRACT

A control valve is used in an antiskid braking system which has a main piston displaced to effect antiskid control. The outlet end of a chamber formed by one end of the piston communicates with the wheel cylinder while the other end of the piston defines an inlet chamber in communication with the master cylinder. To avoid pressure surges in the direction of the master cylinder a reaction piston having one end bearing against the main piston and the other end defining the inlet chamber. The reaction piston is hydraulically biased against the main piston. As a result, the reaction piston follows the displacement of the main piston so that there are no or only minor volume changes in the inlet chamber.

8 Claims, 2 Drawing Figures

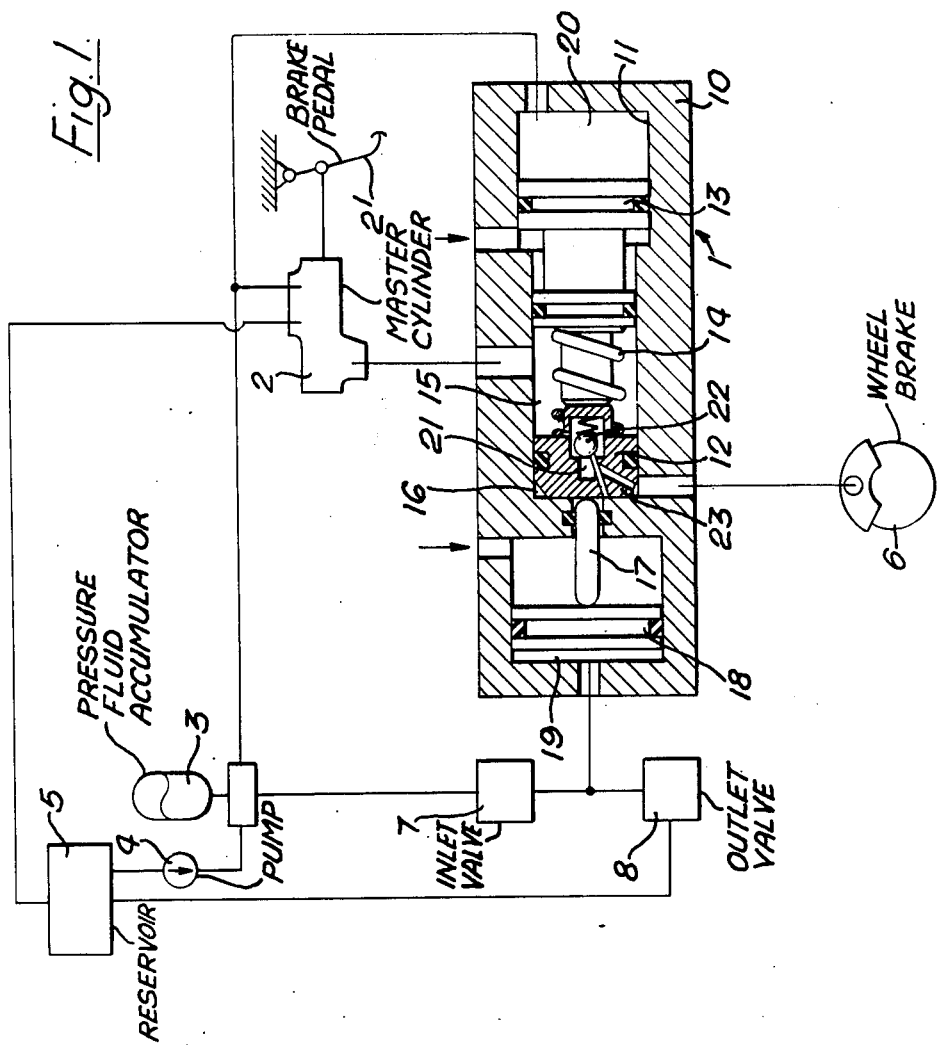

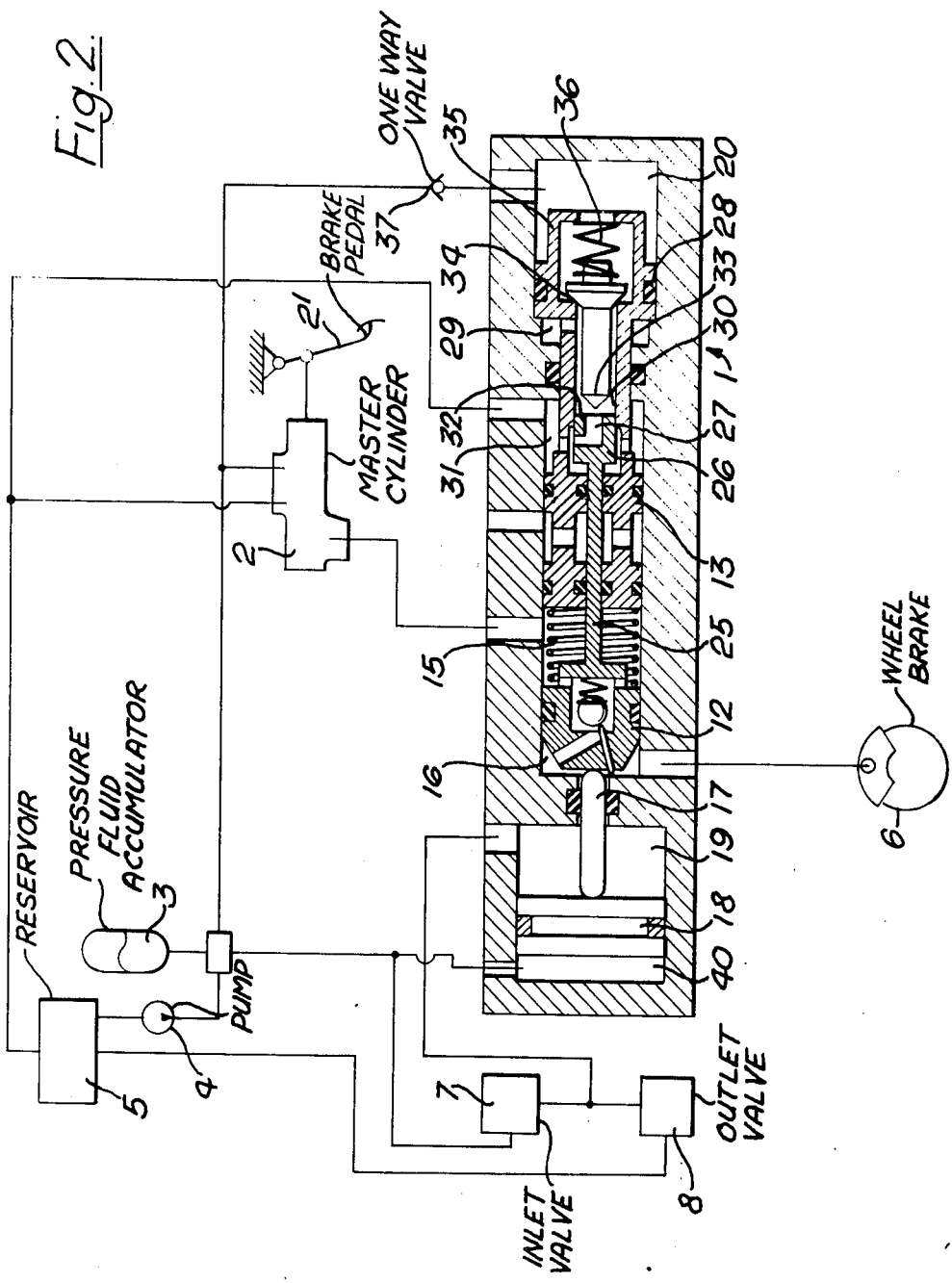

DEVICE FOR HYDRAULIC BRAKING SYSTEM INCORPORATING ANTISKID CONTROL APPARATUS

Background of the Invention

This invention relates to a device for hydraulic braking systems incorporating antiskid control apparatus, including a piston which is disposed slidably sealed in a bore and defines at its one end an inlet chamber communicating with a master cylinder and at its other end an outlet chamber connecting with at least one wheel braking cylinder, and has a passageway connecting the inlet chamber with the outlet chamber, adapted to be closed off by a valve member. The valve member is mechanically kept in the open position in that piston end position in which the volume of the outlet chamber is smallest, and with the piston being displaceable by means of a control piston to increase the volume of the outlet chamber. Such a device is known from German Pat. No. 1,113,646.

In the known device, if a locked-wheel condition develops, the control piston is acted upon by a control pressure drawn from a pressure-fluid accumulator through valves controlled by the antiskid control apparatus. The control piston thereby displaces the piston such that the volume of the outlet chamber increases while the valve member closes immediately. As a result of the volume increase in the outlet chamber, the braking pressure of the wheel braking cylinder connected thereto drops, thereby avoiding a locked-wheel condition. However, the volume increase in the outlet chamber results at the same time in a decrease of the volume of the inlet chamber, and the pressure fluid urged out of this chamber is returned to the master cylinder.

Though this device has the advantage that in the event of failure of the accumulator pressure the braking system will continue to operate in such a manner as if no antiskid control were available, it is nevertheless a decisive disadvantage therein that each control cycle leads to shocks at the brake pedal which are due to the fact that the entire fluid volume, which is determined by the cross-sectional area of the piston and its movement, is urged into the master cylinder. Considering further that several of such devices are fitted to a vehicle equipped with antiskid control apparatus, for example, one device for each front wheel and a correspondingly larger dimensioned device for the two rear wheels, and considering still further that these devices often respond at the same time, it will be readily obvious that the shocks occurring at the brake pedal are quite substantial and consequently not only disturbing but may also be the cause of panic reactions of the driver and, as a result, constitute a traffic danger.

Summary of the Invention

It is the object of this invention to improve upon a device of the type initially referred to in such a manner that control cycles cannot be felt any longer at the brake pedal, at least not in the degree described above.

A feature of the present invention is the provision of a device for hydraulic braking systems incorporating antiskid control apparatus comprising: a main piston disposed in a slidably sealed relation with a bore of a housing, one end of the main piston defining an outlet chamber connected to at least one wheel braking cylinder; a passageway disposed in the main piston connecting an inlet chamber with the outlet chamber, the passageway adapted to be closed off by a valve member, said valve member being mechanically kept in the open position when the volume of the outlet chamber is smallest; a control piston disposed adjacent the outlet chamber to displace the main piston to increase the volume of the outlet chamber; and a reaction piston disposed to abut the other end of the main piston, the main piston and the reaction piston defining the inlet chamber communicating with a master cylinder, the actuation surface of the reaction piston remote from the main piston defining a reaction chamber in direct communication with a pressure-fluid accumulator.

By means of this method it is achieved that the volume of the inlet chamber will not decrease in the same degree as the volume of the outlet chamber increases during a control cycle. If the diameter chosen for the reaction piston is precisely the same as the diameter of the piston, the inlet chamber volume will not decrease at all.

It will be an advantage to dispose a return spring between the piston and the reaction piston. In case of failure of the accumulator pressure, this spring causes the reaction piston to assume its position remote from the piston before the commencement of a braking action, and pressure fluid is drawn from a reservoir and fed into the inlet chamber. By these means, the device requires no pressure fluid from the master cylinder during a braking operation.

It is a further advantage to design the reaction piston as a stepped piston the larger actuation end of which is closest to the reaction chamber. This method permits the device to be utilized in braking systems in which the accumulator pressure is lower than the maximum permissible braking pressure.

By choosing the ratio between the actuation surface closest to the reaction chamber and the actuation surface of the stepped piston closest to the inlet chamber so it corresponds to the ratio between the normal accumulator pressure and the maximum permissible braking pressure, it is at the same time ensured that the maximum permissible braking pressure is not exceeded. Namely, as soon as the maximum permissible braking pressure would be exceeded by excessive braking at the brake pedal, the reaction piston would withdraw, pressure fluid would be allowed to enter the inlet chamber and the braking pressure would be limited practically.

In a particularly advantageous embodiment, the stepped piston has a third actuation surface defining an annular chamber which normally communicates with an unpressurized reservoir, with this connection being, however, adapted to be shut off by a valve operable by the piston as it approaches. The annular chamber is in communication with the reaction chamber and with the stepped piston being urged in the direction of the reaction chamber by the pressure in the annular chamber. By this method it is achieved that the stepped piston is always subjected to such a displacement force that a constant distance is maintained relative to the piston, without it being necessary for this displacement force to be completely transmitted by the piston, which also permits the control piston to be of smaller size. Whether or not this displacement force alone is sufficient to cause the stepped piston to follow the movement of the piston, depends on the structural design. In case a force difference remains, it is only this difference that will have to be transmitted from the piston to the stepped piston by mechanical means.

It will be a design advantage to provide in the stepped piston a blind-end bore which is open towards the reaction chamber, with a valve element which has a passageway and a valve seat closest to the reaction chamber, being slidably sealed in the bore. The valve element is supported in the direction of the piston upon an extension extending into the blind-end bore in a sealed relationship thereto, to provide at the orifice of the blind-end bore a second valve seat against which a valve member is biased by means of a spring, the pointed end of the valve member which projects into the blind-end bore cooperating with the valve seat of the valve element, and to provide, between the valve element and the second valve seat, a passage linked with the annular chamber.

Further, the reaction chamber is connected with the accumulator through a one-way valve inhibiting flow in the direction of the accumulator. By this method it is achieved that in the event of accumulator-pressure failure the stepped piston does not move away from the piston under the action of the master-cylinder pressure in the inlet chamber, because in that case pressure fluid is no longer allowed to flow out of the reaction chamber, that means the reaction chamber is hydraulically blocked.

Brief Description of the Drawing

Above-mentioned and other features and objects of this invention will become more apparent by reference to the following description taken in conjunction with the accompanying drawing, in which:

FIG. 1 is a longitudinal cross-section of an embodiment in accordance with the principles of the present invention without follow-up control; and FIG. 2 is a longitudinal cross-section of an embodiment in accordance with the principles of the present invention with follow-up control.

Description of the Preferred Embodiments

FIG. 1 shows a sectional view of the device 1 constructed in accordance with the present invention. Connected to device 1 is a master cylinder 2, a brake pedal 2', a pressure-fluid accumulator 3, a pump 4, a reservoir 5, a wheel brake 6, an inlet valve 7 and an outlet valve 8. The connections between these components are shown by appropriate lines. The design of components 2 to 8 is of no relevance. They are illustrated merely for the purpose of providing a better understanding of the function of device 1.

Device 1 has a housing 10 with a stepped bore 11 accommodating in a section of smaller diameter a main piston 12 in a slidably sealed relationship thereto. Further, stepped bore 11 accommodates slidably sealed therein a reaction piston 13 of stepped design. A spring 14 is disposed between main piston 12 and reaction piston 13. An inlet chamber 15 communicating with master cylinder 2 is defined by main piston 12 on its one end and by stepped piston 13 on its other end. The end of main piston 12 remote from inlet chamber 15 defines an outlet chamber 16 which communicates with wheel brake cylinder 6. Slidably sealed extending into outlet chamber 16 is a tappet 17 which is supported on main piston 12. In the direction of piston 12, a control piston 18 is supported on tappet 17, defining with its end remote from tappet 17 a control chamber 19. Control chamber 19 is in communication with the pressure-fluid accumulator 3 through inlet valve 7 or with the unpressurized reservoir 5 through outlet valve 8. With its end remote from inlet chamber 15, reaction piston 13 defines a reaction chamber 20 which is in permanent communication with pressure-fluid accumulator 3. Provided in main piston 12 is a pressure-fluid passageway 21 connecting inlet chamber 15 with outlet chamber 16 and including a spring-loaded valve member which is designed as a ball 22. Via a tappet 23 which is adapted to take support on the bottom of outlet chamber 16, ball 22 is lifted off its valve seat as long as main piston 12 is in its left-hand end position when viewing the drawing.

The mode of operation of the embodiment of FIG. 1 is as follows:

Prior to the commencement of a braking action, all parts are in their positions as illustrated. Reaction chamber 20 is pressurized to the full accumulator pressure keeping reaction piston 13 in abutment with main piston 12 in opposition to the action of spring 14, as shown in the drawing. There is free flow of pressure fluid between inlet chamber 15 and outlet chamber 16. As long as no danger of wheel lock exists, inlet valve 7 is in the closed position, while outlet valve 8 is in the open position, thereby providing for an unpressurized connection between control chamber 19 and reservoir 5.

As a result, braking pressure building up will first pass from master cylinder 2 to wheel brake cylinder 6 unhindered. If a danger of wheel lock arises because of excessive braking pressure, outlet valve 8 will close and inlet valve 7 will open, thereby connecting accumulator 3 with control chamber 19. By these means, control piston 18, tappet 17, main piston 12 and reaction piston 13 will be shifted to the right when viewing the drawing. As a result of the displacement of main piston 12, tappet 23 will be lifted off the bottom of outlet chamber 16, thereby seating ball 22 on its valve seat and shutting off the connection between inlet chamber 15 and outlet chamber 16. The ensuing further volume increase of outlet chamber 16 will cause the pressure fluid to be depressurized so that the braking pressure effective in the wheel brake cylinder 6 will be reduced. As soon as the wheel-locking danger is eliminated, inlet valve 7 and outlet valve 8 will return to their normal positions so that the control pressure in chamber 19 will be reduced and all parts will be returned to their illustrated positions by the accumulator pressure acting in reaction chamber 20 on reaction piston 13. Of course, provisions can also be made to close both the inlet valve 7 and the outlet valve 8 during a control cycle whereby all parts remain in the positions reached by that time and the braking pressure in outlet chamber 16 remains constant independent of the master-cylinder pressure as long as the master-cylinder pressure is higher than the braking pressure in outlet chamber 16. Namely, if the master-cylinder pressure drops below the braking pressure in outlet chamber 16 during a control cycle, ball valve 22 has the effect of a one-way valve opening in the direction of inlet chamber 15, so that the braking pressure in outlet chamber 16 will then decrease in synchronism with the master-cylinder pressure, independent of the position of main piston 12.

In the event of failure of the pressure-fluid accumulator 3, reaction chamber 20 becomes depressurized. As a result, reaction piston 13 is displaced to the right under the action of spring 14. Inlet chamber 15 whose volume increases thereby draws pressure fluid through master cylinder 2. At a subsequent braking operation, there is free flow of pressure fluid between master cylinder 2 and wheel brake cylinder 6 because, due to the lack of accumulator pressure, there is no force which could displace piston 12 away from its illustrated position.

But even if the pressure of the pressure-fluid accumulator 3 breaks down during a control cycle, normal function of the braking system without antiskid control will be ensured because piston 12 is then only subjected to the pressures in inlet chamber 15 and outlet chamber 16, acting, as long as it does not reach the illustrated end position, as a floating piston, thereby transmitting the master-cylinder pressure in inlet chamber 15 to outlet chamber 16 where it causes the appropriate braking pressure to build up. As soon as it reaches the illustrated end position, passageway 21 will be opened.

In the embodiment of FIG. 2, the parts identical with those of FIG. 1 are assigned like reference numerals and will not be explained again in the following. The substantial difference of the embodiment of FIG. 2 from FIG. 1 is that main piston 12 has an extension 25 extending into a blind-end bore 30 of reaction piston 13 which bore is open in the direction of reaction chamber 20. Blind-end bore 30 accommodates slidably sealed therein a valve element 26 including a connecting passage 27. Connecting passage 27 is in permanent, unpressurized communication with reservoir 5 via channels 31 and opens into blind-end bore 30 with a valve seat 32 towards reaction chamber 20. At its orifice opening into reaction chamber 20, blind-end bore 30 has a second valve seat 34 where it can be closed by a valve member 28. Valve member 28 is spring-loaded in the direction of the second valve seat 34 by means of a spring 36 which is held in a cage 35. Connecting passage 27 is adapted to be closed at valve seat 32 by means of a pointed end 33 of valve member 28 which end projects into blind-end bore 30. Between the second valve seat 34 and valve element 26, blind-end bore 30 connects with an annular chamber 29. A one-way valve 37 which inhibits flow in the direction of pressure-fluid accumulator 3, is disposed in the pressure-fluid line between pressure-fluid accumulator 3 and reaction chamber 20.

Another difference from the embodiment of FIG. 1 is that control chamber 19 is defined by the end of piston 18 closest to outlet chamber 16. The other end of control piston 18 defines in the embodiment of FIG. 2 a counterpressure chamber 40 which is in permanent communication with pressure-fluid accumulator 3. As the only consequence of this difference, a displacement of control piston 18 to the right is not effected by pressure building up in control chamber 19, but by pressure fluid being withdrawn from control chamber 19 so that it is the pressure from pressure-fluid accumulator 3 that causes, in the counterpressure chamber 40, displacement of control piston 18. In this process, inlet valve 7 is open in the normal position while outlet valve 8 is closed in the normal position so that control chamber 19 is at all times pressurized by the full accumulator 3 pressure as long as no control cycle takes place. Accordingly, to obtain a pressure decrease in outlet chamber 16, inlet valve 7 is closed while outlet valve 8 is opened. During a control cycle main piston 12 is displaced through tappet 17 in the same manner as in the embodiment of FIG. 1, with the forces to be transmitted being, however, lower because of the special design in reaction piston 13.

Namely, as main piston 12 moves towards reaction piston 13, extension 25 displaces valve element 26 towards valve member 28. The pointed end 33 of valve member 28 thus comes to seat on valve seat 32, thereby closing connecting passage 27. As displacement continues, valve member 28 is lifted off the second valve seat 34, thereby permitting fluid flow from reaction chamber 20 into annular chamber 29 through blind-end bore 30. The pressure thus developing in annular chamber 29 acts on reaction piston 13 to the right and displaces it. As soon as the displacement travel has reached a magnitude corresponding to the displacement travel of main piston 12, not considering, however, the control travel, valve member 28 will again be seated on the second valve seat 34 without valve seat 32 being disengaged thereby, so that reaction piston 13 will then remain in that position.

Only when main piston 12 moves again to the left will valve seat 32 be disengaged, thereby permitting fluid flow from annular chamber 29 through the thus open connecting passage 27 and the channels 31 to reservoir 5. By this process, annular chamber 29 becomes depressurized again and the reaction piston will likewise be displaced to the left upon the action of the pressure in reaction chamber 20. Thus, reaction piston 13 always follows the movement of main piston 12 without it being necessary for main piston 12 to transmit the displacement force required to reaction piston 13. By these means, less force is required at control piston 18 which results in a quicker response of device 1.

A substantial functional advantage results in the embodiment of FIG. 2 in the event of failure of accumulator 3 pressure. Check valve 37 prevents fluid to be returned from reaction chamber 20 to the accumulator which has failed. Because of the lack of displacement force, main piston 12 cannot be moved to the right either so that valve member 28 will remain seated on the second valve seat 34. Thus, reaction chamber 20 is completely shut off, with the pressure fluid therein contained providing a support for reaction piston 13 against the braking pressure in inlet chamber 15 and preventing movement of reaction piston 13 to the right. As a result, the volume of inlet chamber 15 will not be increased in the event of failure of accumulator 3 so that no additional pressure fluid need be fed into it from master cylinder 2.

While I have described above the principles of my invention in connection with specific apparatus it is to be clearly understood that this description is made only by way of example and not as a limitation to the scope of my invention as set forth in the objects thereof and in the accompanying claims.

I claim:

1. A device for hydraulic braking systems incorporating antiskid control apparatus comprising:

a main piston disposed in a slidably sealed relation with a bore of a housing, one end of said main piston defining an outlet chamber connected to at least one wheel braking cylinder;

a passageway disposed in said main piston connecting an inlet chamber with said outlet chamber, said passageway adapted to be closed off by a valve member, said valve member being mechanically kept in the open position when the volume of said outlet chamber is smallest;

a control piston disposed adjacent said outlet chamber to displace said main piston to increase the volume of said outlet chamber; and a reaction piston disposed to abut the other end of said main piston, said main piston and said reaction piston defining said inlet chamber communicating with a master cylinder, the actuation surface of said reaction piston remote from said main piston defining a reaction chamber in direct communication with a pressure-fluid accumulator.

2. A device according to claim 1, wherein the diameter of said reaction piston equals the diameter of said main piston.

3. A device according to claim 1, further including a spring encircling a portion of said reaction piston and disposed between said main piston and said reaction piston.

4. A device according to claim 1, wherein the ratio between the actuating end of said reaction piston closest to said reaction chamber and the actuating end of said reaction piston closest to said input chamber equals the ratio between the normal pressure of said accumulator and the maximum permissible braking pressure.

5. A device according to claim 1, wherein said reaction piston is a stepped piston with the larger actuating surface being disposed closest to said reaction chamber and the smaller actuating surface abutting said other end of said main piston.

6. A device according to claim 5, wherein said stepped piston includes
a third actuating surface defining an annular chamber normally being connected with an unpressurized reservoir with this connection being adapted to be shut off by a valve operable by said main piston, said annular chamber being in communication with said reaction chamber, said stepped piston being urged in the direction of said reaction chamber by the pressure in said annular chamber.

7. A device according to claim 6, wherein said stepped piston includes
a blind-end bore which has an orifice opening towards said reaction chamber,
a valve element which has a passage and a first valve seat closest to said reaction chamber slidably sealed in said blind-end bore, said valve element being supported in the direction of said main piston upon an extension extending into said blind-end bore in a sealing relationship thereto,
a second valve seat disposed at said orifice,
a valve member biased by means of a spring toward said second valve seat, said valve member having a pointed end projecting into said blind-end bore to cooperate with said first valve seat, and
a passage from said annular chamber between said valve element and said second valve seat.

8. A device according to claim 7, further including a one-way valve disposed between said reaction chamber and said accumulator to inhibit flow of fluid in the direction of said accumulator.

* * * * *